United States Patent [19]

Smith et al.

[11] Patent Number: 5,120,190

[45] Date of Patent: Jun. 9, 1992

[54] PARTS ASSEMBLY KITTING APPARATUS AND METHOD

[75] Inventors: Paul R. Smith, Ortonville; Orval F. Wolfgram, Saginaw, both of Mich.; Rudolph G. Kobelia, Homer, N.Y.

[73] Assignee: General Motors Corporation, Detroit, Mich.

[21] Appl. No.: 682,286

[22] Filed: Apr. 9, 1991

Related U.S. Application Data

[62] Division of Ser. No. 555,331, Jun. 29, 1990, Pat. No. 5,069,329.

[51] Int. Cl.$^5$ .................................... B65G 47/24
[52] U.S. Cl. ................................ 414/786; 198/391; 198/752
[58] Field of Search ............ 414/416, 417, 403, 730, 414/273, 274, 222, 736; 198/382, 751, 752, 391, 394; 901/47

[56] References Cited

U.S. PATENT DOCUMENTS

| | | | |
|---|---|---|---|
| 4,050,572 | 9/1977 | Armstrong | 198/751 X |
| 4,456,822 | 6/1984 | Rose et al. | 198/751 X |
| 4,651,863 | 3/1987 | Reuter et al. | 414/416 X |
| 4,678,390 | 7/1987 | Bonneton et al. | 414/416 X |
| 4,705,081 | 11/1987 | Birk et al. | 901/47 X |

FOREIGN PATENT DOCUMENTS

| | | | |
|---|---|---|---|
| 130812 | 8/1983 | Japan | 198/752 |
| 152708 | 9/1983 | Japan | 198/752 |

*Primary Examiner*—Frank E. Werner
*Attorney, Agent, or Firm*—Ernest E. Helms

[57] ABSTRACT

The present invention provides an apparatus and method of a feeder for singulating and feeding various shaped sized and shaped parts without major modification. The present invention also provides an arrangement which utilizes the feeder.

1 Claim, 3 Drawing Sheets

PARTS ASSEMBLY KITTING APPARATUS AND METHOD

This is a division of application Ser. No. 07/555,331 filed on Jun. 29, 1990 which is a divisional of U.S. Pat. No. 4,988,256 filed on Oct. 22, 1987, now U.S. Pat. No. 5069329.

FIELD OF THE INVENTION

The field of the present invention relates to arrangements and methods for making kits from various unique parts. More particularly, the present invention relates to kit making in an automotive assembly environment.

DISCLOSURE STATEMENT

In bowl feeders, a common type of feeder used in the automotive industry, parts are dumped in bulk form, without any known orientation into a bowl. The bowl is attached to a heavy base through a system of springs and vibrated with either an air or electromechanical vibrator attached to the bowl. The base of the bowl is conical or cylindrical. The parts seek the outer diameter of the bowl and then proceed up an internal spiraling track. During the upward spiral the parts pass a number of specially fitted tooling details which reject several of the undesirable orientations presented. The parts which are rejected fall off the track and return to the bulk supply. At the end of the spiral, a sufficient amount of orientations have been rejected to leave only the desired orientation and the part is usually dispensed down a gravity chute which maintains the orientation of the part and delivers the part to an escapement mechanism. At the escapement mechanism, parts are ready for either manual or robotic picking.

The use of bowl feeders presents several problems. Bowl feeders are built without detailed designs. The feeders are built by trial and error using a sampling of parts furnished by the customer to the feeder vendor. The construction of bowl feeders is considered an art form and finished bowl feeders are not documented with detailed drawings and often can't be duplicated, in terms of performance. As parts change, often only slightly, bowl feeders become obsolete and new ones must be developed to replace them. Thus most bowl feeders must be viewed as dedicated equipment, serving the needs of dedicated automation lines.

For batch production of families of products, methods of wholesale exchange of bowl feeders specific to each batch are required. For those few bowl feeders which, if from the start are built to handle two parts, no method of automatically changing over from one part to another is in practice. Downtime with dedicated bowl feeders is usually quite high, requiring regular attendants due to the tooling required to eliminate undesirable orientations. The discriminating tooling increases possibility of jams due to off-size or off-shape parts. The feeding and jamming of parts is further aggravated by contamination, dirt build-up and foreign parts.

SUMMARY OF THE INVENTION

The invention solves the above noted shortcomings by providing a feeder that can feed a variety of parts without tooling dedicated to specific parts. Therefore the feeder of present invention is less likely to jam or be made obsolete by product changes. The inventive feeder can be purged automatically and/or refilled. Parts are not confined to tracks at the exit point but are open at the pick up point. The features of the inventive feeder which aid in the singulation and orientation functions are mainly passive, requiring no actuation, influencing only those part families for which they were designed, and are relatively unaffected by contamination. Thus the reliability of the feeder is significantly improved.

Another advantage of the present inventive feeder is by being universal and automatically purgable, it can switch from one unique part to another unique part. The above results in greater feeder utilization, a lower required investment in feeders, and a savings in floor space. Maintenance requirements are also less. The above noted benefits are especially attractive in low or medium volume batch production operations.

The present inventive feeders can be used to advantage in a production situation in a novel arrangement to formulate kits. The function of the arrangement is to produce a tray of parts, which when assembled makes one final assembly unit. An example of a kit would be the various parts required for front wheel drive axle assemblies. Each sized axle has between 8 and 12 purchased parts which must be kitted on schedule demand. Each of the purchased parts will vary in size, according to the axle size. The inventive arrangement allows the feeder to be used for different unique parts which differ in shape as well as parts which vary in size allowing a major decrease in the amount of feeders required versus the historical arrangement of dedicated feeders.

It is the object of the present invention to provide an apparatus and method of utilization thereof of an arrangement for kitting separate unique parts into assembly kits. It is also the object of the present invention to provide a feeder mechanism which can be used in a wide range of parts.

It is yet another object of the present invention to provide an arrangement for compiling parts into individual kits made up of a first number of unique parts, each unique part being stored in bulk in a separate first bin, the arrangement including robotic manipulating means for sensing and then taking an individual unique part and placing the part in the kit, at least one nest for each unique part for holding the part for the manipulating means, a second number of diverting means for selectively delivering the parts to the respective nest, the second number being less than the first number and the diverting means including a fiber oriented vibrational turn table, and a third number of fabric oriented vibrational feeders for accepting the parts in bulk from the first bin and singulating and orientating the parts to the diverting means whereby the third number is lower than the second number and whereby the feeder may relieve itself of a first unique part after singulating and orientating a desired number of first unique parts and then after can accept in bulk a second unique part and singulate and orientate the second unique part to the diverting means without major adjustment of the feeder.

It is yet another object of the present invention to provide a method for compiling parts into individual kits made up of a first number of unique parts, each unique part being stored in bulk in a separate first bin, the method including loading one of a third number of feeder means with a bulk of first unique parts from the first bin, singulating the first unique parts from the feeder means to one of a second number of diverting means, the second number being lower than the first number, delivering the first unique parts from the diverting means to a separate nest, manipulating the first unique parts from the nest to a kitting tray, relieving the first unique parts from the feeder means, loading the feeder means with at least second unique parts, singulating the second unique parts to the diverting means, delivering the second unique parts from the diverter means to a separate nest, manipulating the second unique parts from the separate nest to the kitting tray.

It is yet another object of the present invention to provide a parts feeder for singulating a plurality of different unique parts, the feeder including a vibrator means, and a fabric oriented platform mounted onto the vibrator means, the platform including a load section for accepting unique parts in bulk with fabric oriented to impart movement of the parts in a general first direction, a first compound inclined ramp section with fabric oriented to impart movement of the parts in a general second direction and being inclined to cause non-singulated parts to fall and return to the load section, a second drop off ramp for accepting singulated parts from the first ramp and with fabric oriented to impart movement to the singulated parts to a desired workstation, and a gate between the load section and the inclined ramp whereby the gate in a closed position allowing the unique parts movement between the load section and the first ramp and the gate in the open position allowing the feeder to purge itself of the first unique part and thereafter the reclosing of the gate the feeder can be used to singulate a second unique part differing from the first unique part without further adjustment.

Further objects, desires and advantages of the present invention will become more apparent to those skilled in the art as the nature of the invention is better understood from the accompanying drawings and the detailed description.

DETAILED DESCRIPTION OF THE DRAWINGS

Figure 2:
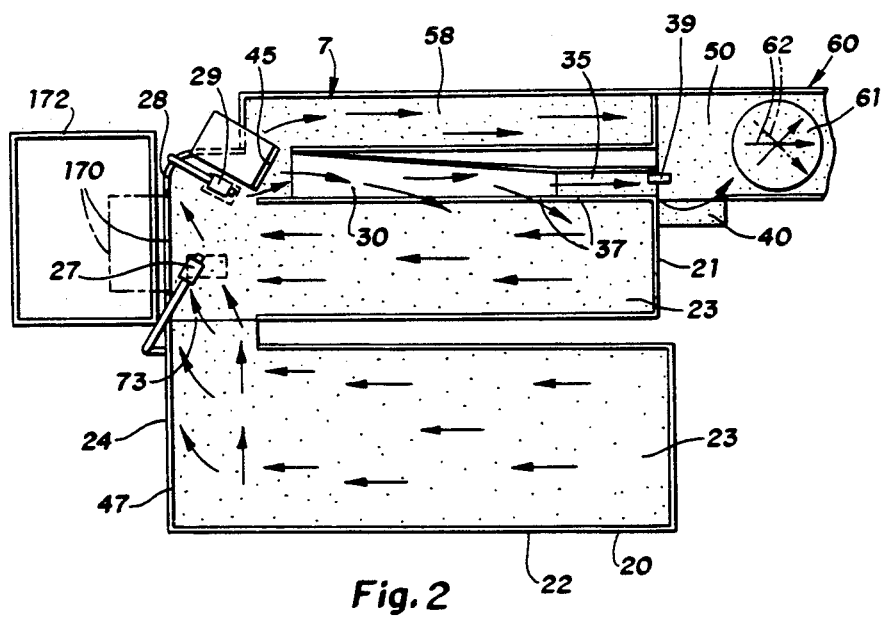
FIG. 2 is a top plan view of a feeder of the present invention.
Figure 3:
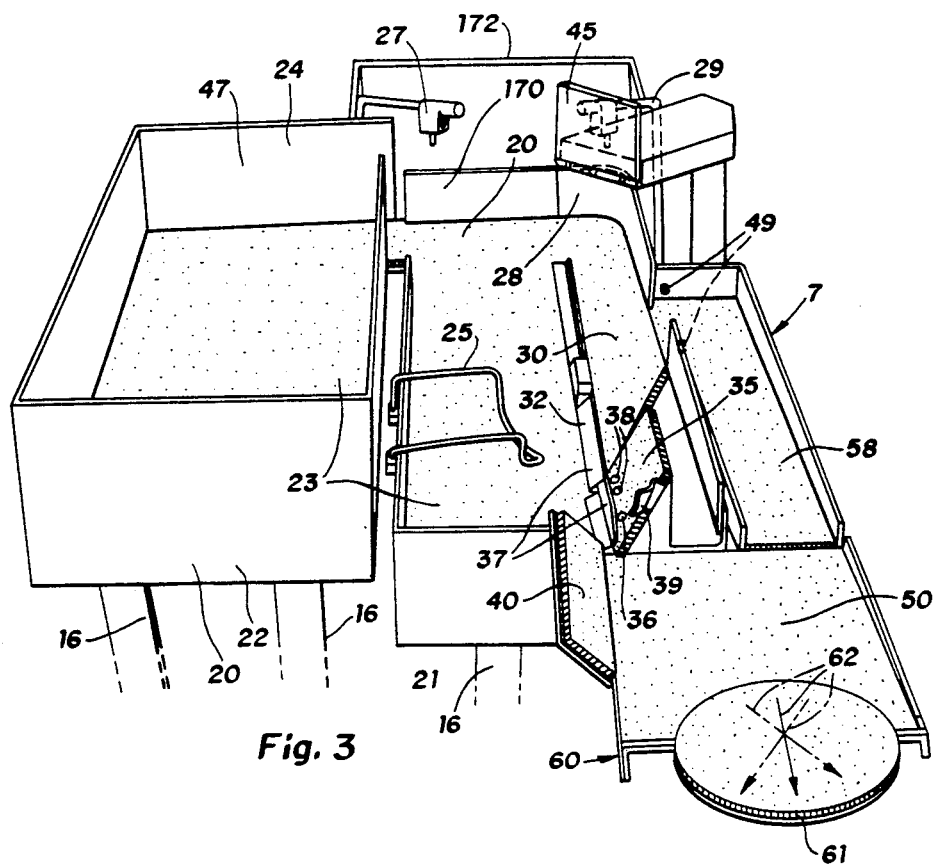
FIG. 3 is a front perspective view of a feeder of the present invention.
Figure 4:
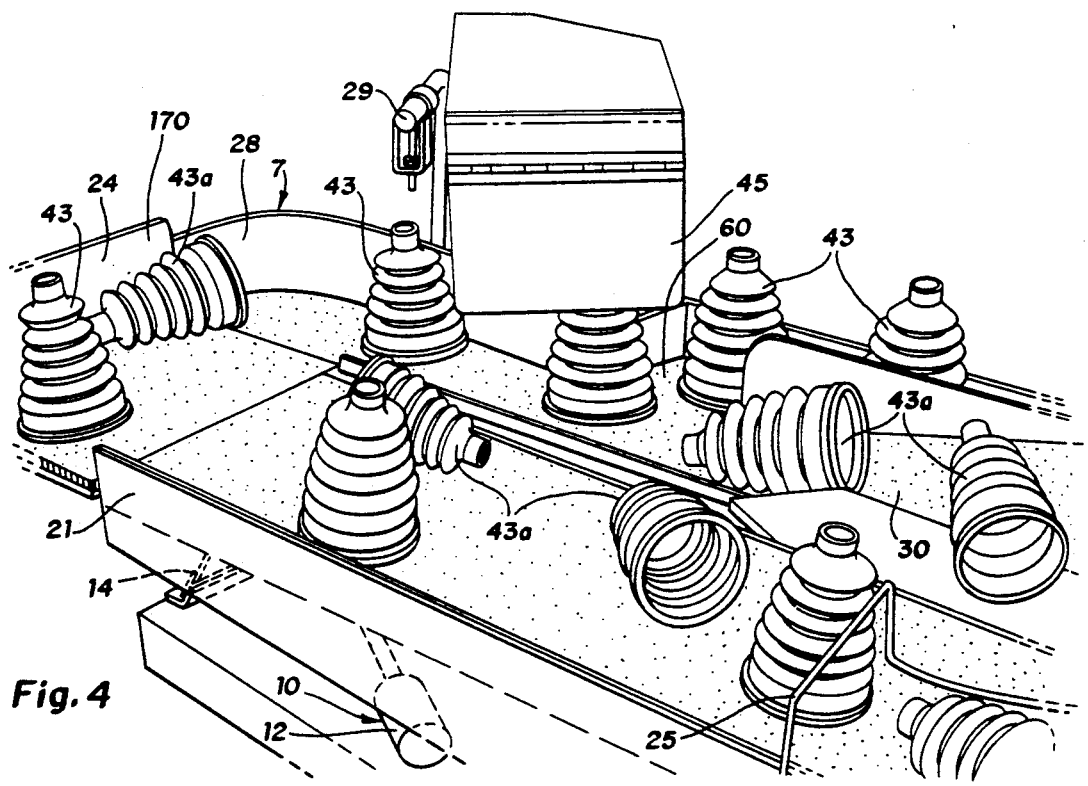
FIG. 4, 5 and 6 are perspective views of the feeder singulating front wheel drive axle seals, bushing and wire snap rings respectively.

Referring to FIGS. 2, 3 and 4 the feeder means 7 of the present invention has a vibrator means 10 powered by and electric or pneumatic motor 12 in contact with a series of vertical springs 14 (FIG. 4). A typical vibrator means 10 is supplied under the trade name Dyna-Slide Orienter Feeders ™ by the Lipe-Rollway Co., Syracuse, NY. Legs 16 supports the vibrator means 10 from the floor (FIG. 3).

Mounted on top of the vibrator means 10 is a fabric oriented platform 20. Platform 20 is an open table top structure having a bristle material sloped at approximately 70 degrees to its substrate. A typical bristle material has the trade name Brushlon and is manufactured by the 3M Company ™, St. Paul, Minn. Any vibration of the platform causes the parts, which are resting on the bristles to move in the direction that the bristles are sloped. Since the material moves in the direction that the fiber is oriented, the flow path of the material on top of the platform 20 can be modified by changing the orientation of the fiber in a given portion of the platform.

The platform 20 has a primary 21 and secondary 22 "dump area or bed" hereinafter referred to as the load section. The primary 21 load section will be loaded with a bulk of parts. The load section 22 is provided for larger sized parts or for higher volume runs. The primary and secondary load sections 21 and 22 have a dump end 23. The parts are dumped at the dump end 23 by an overhead gantry robot. The fiber of the load sections 21, 22 are oriented to move the parts in a first direction toward end 24. The primary load section 21 (and the secondary load section 22 if desired) is inclined so that the parts become singulated and climb uphill as they approach the end 24. Optical sensors 27 and 29 provide a means of measuring part flow for controlled delivery from the load sections 21 and 22.

The singulated parts continue their travel along wall 47, around bend 28 and then proceed to a first compound inclined ramp 30. The compound inclined ramp is covered with fabric oriented to impart movement of the parts in a generally second direction.

Figure 5:
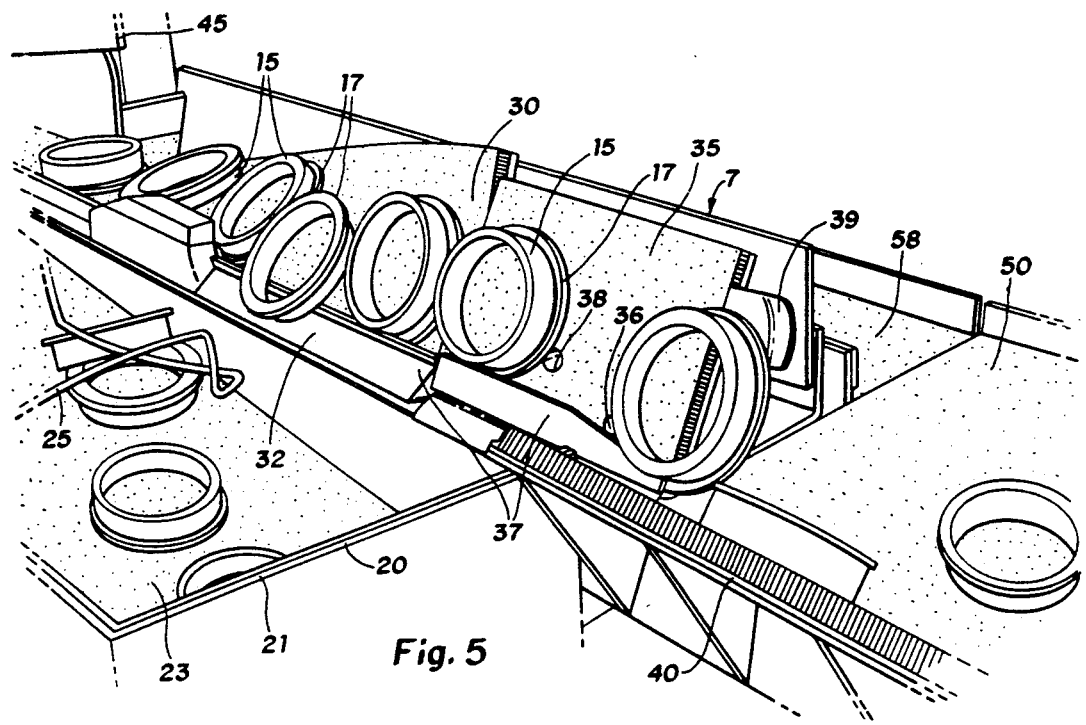
Figure 6:
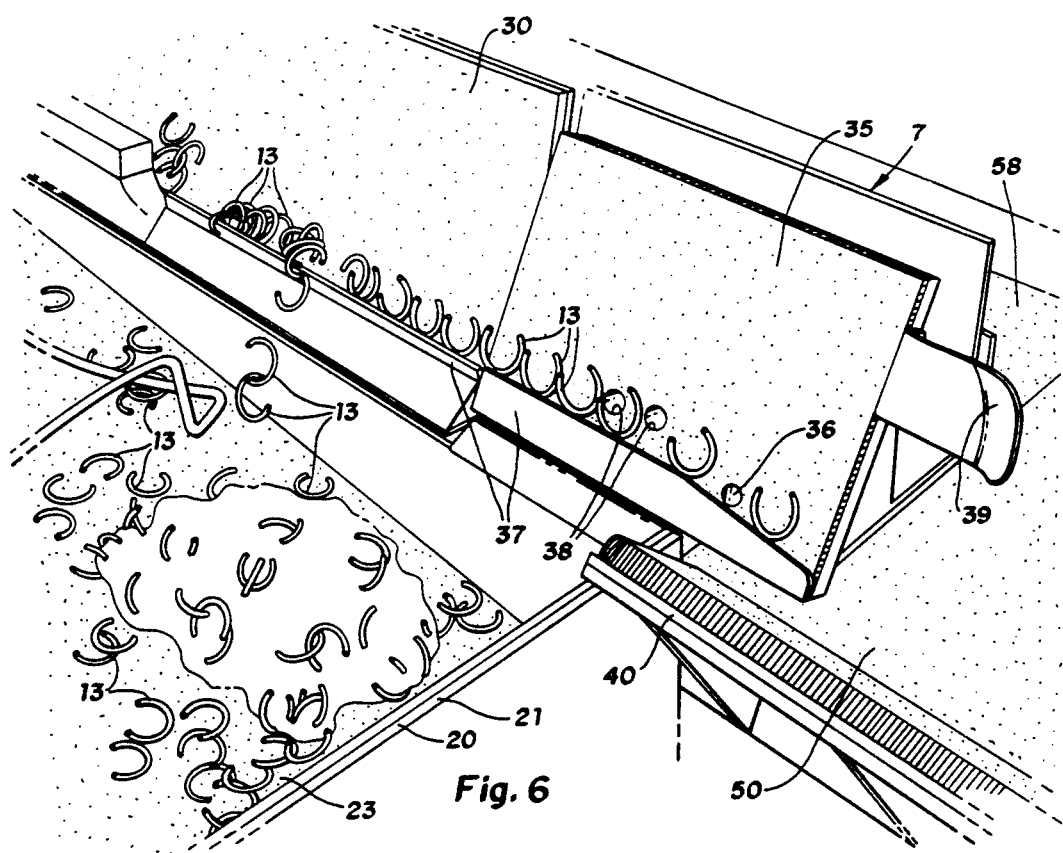

Only singulated parts may continue forward. The twist of the first ramp 30 causes the remaining non singulated parts to fall back into the primary load section 21. The twist of first ramp 30 at end 35 changes the plane of the part to almost sixty degrees from horizontal. First ramp 30 also has a ledge 37. The ledge 37 has two functions. For small parts such as snap rings 13 (FIG. 6) the ledge 37 prevents the smaller parts from returning to primary load section 21. For large parts such as bushing 15 (FIG. 5) the ledge 37 becomes a pivot point for improperly oriented bushings 15 to fall back into primary load section 21.

End 35 has a sensor 36 which is utilized in making a count of parts which have passed. When the desired number of parts have been delivered, blow openings 38 by use of a pneumatic supply line push any remaining parts on ledge 37 back into primary load section 21.

The feeder 7 has a second drop off ramp 40 for accepting singulated parts from the first ramp 30. The fabric of the second ramp 40 is oriented to deliver the parts to a desired work station 50. When singulating bushings 15 it is desirable that the flanges 17 be on the upper side. Flipper 39 on the end of first ramp 30 causes the bushings 15 to be flipped over onto second ramp 40.

For singulating seals 43 (commonly referred to as boots), there is provided a secondary exit path section 58 which is an alternate path to the first ramp 30. The secondary exit path is provided with a movable hinged paddle means 45 to deflect the boots which are in the proper orientation over, to the secondary exit path 58. The improperly oriented boots 43a (laying on the side) proceed onward to first ramp 30 and fall back into primary load section 21. An optional railing 25 can be used which tends to urge seals entering primary load section 21 from first ramp 30 into an upright position.

When a sufficient amount of seals 43 have passed sensor 49, paddle 45 will flip up to allow all of the seals 43 to enter first ramp 30 and fall back into primary load section 21.

Turn table 61 is part of the diverter means. Turn table 61 can be rotated to selected positions to send parts received from workstation 50 to plurality of directions as shown by arrow 62.

Feeder 7 also has a purge gate 170 located between the load section 20 and the first ramp 30. The fabric near the purge gate 170 is oriented in the direction of arrow 73. Therefore the parts will have a tendency to move towards and push up against the purge gate 170. The purge gate 170 will optionally have fabric oriented parallel with the purge gate to further urge the material towards bend 28. When the purge gate is opened (phantom FIG. 2) the parts in the primary 21 and secondary 22 loading sections will be relieved into purge bin 172. Purging will be invoked after the sensor 36 (or 49 for seal 43) has determined that a sufficient amount of parts have been singulated to the workstation 50 and after the blow offs 38 or paddle 45 have been actuated to prevent parts from being fed to work station 50. When the purge gate 170 is opened, the vibrator means 10 will usually shift to a higher amplitude to save production time.

Figure 1:
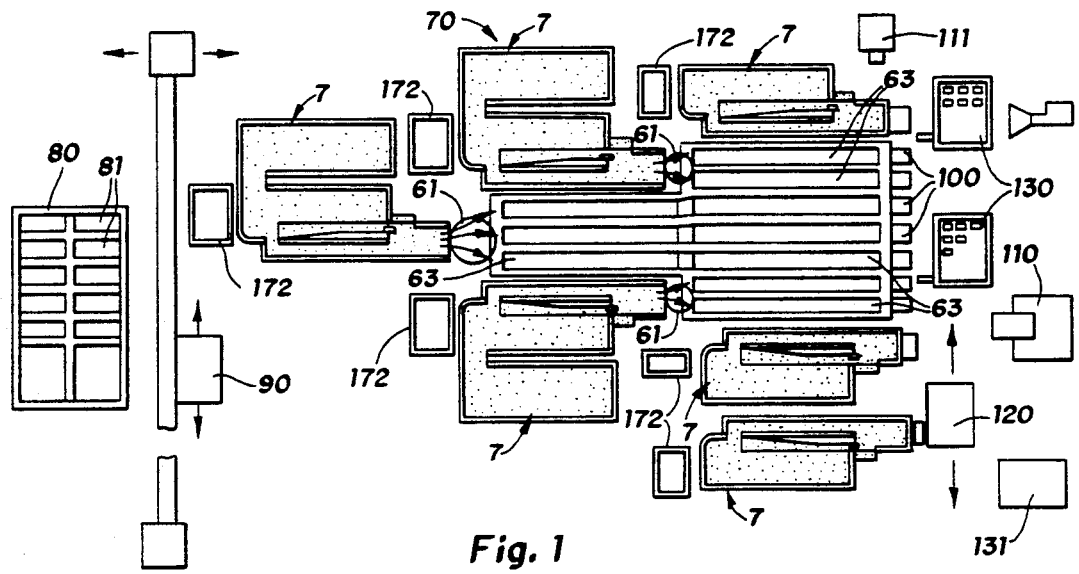
FIG. 1 is a top schematic view of the arrangement of present invention.

Referring additionally to FIG. 1, the arrangement 70 of the present invention for compiling parts into individual kits of a first number of unique parts has a stand 80. The stand 80 has a plurality of separate individual first bins 81 for storing each unique part in bulk. An Automatic Guided Vehicle (AGV) (not shown) with its own stand will deliver the bins 81 of material from the plant warehouse to the arrangement 7. A fill and purge gantry robot 90 mounted to cover will take the bin 81 from the AGV and place the bin in the stand 80. The robot 90 will then deliver the separate unique parts in the bin 81 from stand 80 or the AGV to one of a third number of feeders 7.

The feeder 7 accepts parts in bulk from the bin 81 and then singulates the parts as previously mentioned to the second number of diverter means 60. When the feeder 7 has completed singulating and orientating a desired number of first unique parts, the feeder purge gate 170 is then opened and the remaining parts are placed into the purge bin 172 (usually the bin 81 placed in location by robot 90) whereupon the robot 90 return the bin 81 to the stand 80.

The diverter means 60 as previously described has typically a oriented fabric vibrational turn table 61 (FIG. 3). Each selective direction 62 of the turn table 61 is associated with a diverter connector table 63. The tables 63 also have vibrational fiber oriented type conveyers. These tables 63 deliver the parts to one of a first number of nests 100. Each unique part for a given assembly kit has a separate bin. To save capital costs, typically the feeder 7 is used for the plurality of unique parts, therefore the number of feeders 7 and the number of diverting means 60 will be less than the total number of nests 100 which are supplied for each unique part of a given assembly kit. When in the nests 100 the part is sensed by the vision system 111. The nests 100 are pivotally mounted. If the vision system 111 senses a rejectable part or a part in the improper orientation, table 63 will shut off, nest 100 will pivot to drop the part into a reject bin (not shown). If the proper part in correct orientation is present in nest 100 the kitting robot 120 will manipulate the part to the kitting tray 130 to make up the assembly kit.

The arrangement 70 functions in the following manner: Assembly pallets 131 with an empty kit tray 130 are conveyed by a tray handling robot 110. The robot 110 removes the kit tray 130 and places it on the kitting conveyer or shuttle (not shown) adjacent to the nests 100.

The kitting robot 120 picks parts from the nests 100 of the tables 63 and places them into the kit trays 130. The eight to twelve parts required for each kit have been feed out of only the seven feeders 7. The above is accomplished by using several of the feeders 7 for more than one unique part by alternating feeders 7 use between two or more unique parts by frequent purging and refilling. The feedout tables 63 are the buffer during these parts changes. Full kits are then transferred to a waiting assembly pallat 131 by robot 110.

The present invention provides a method of compiling parts into individual kits made up of a first number of unique parts, each unique part being stored in bulk in a separate first bin 81, the method including the following steps:

1. Loading one of a third number of feeder means with a bulk of first unique parts from the first bin 81;
2. Singulating the first unique parts from the feeder means 7 to one of a second number of diverting means 60, the second number being lower than the first number;
3. Delivering the first unique parts from the diverting means 60 to a separate nest 100;
4. Manipulating 120 the first unique parts from the nest to a kitting tray 130;
5. Relieving the first unique parts from the feeder means 7;
6. Loading the feeder means 7 with at least second unique parts;
7. Singulating the second unique parts to the diverting means 60;
8. Delivering the second unique parts from the diverter means 60 from separate nest 100;
9. Manipulating 120 the second unique parts from the separated nest to the kitting tray 130.

While embodiments of the present invention have been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A method for compiling parts into individual kits made up of a first number of unique parts, a plurality of each said unique part being stored in bulk, in a non-singulated, non-orientated manner, in an individual separate first bin, said method in combination comprising:

loading with a robot one of a third number of vibrational fabric oriented feeder means with a bulk of the first unique parts from said first bin;

singulating said first unique parts from said feeder means, by moving said first unique parts up a vibrational fabric orientated inclined ramp and thereby causing non-singulated parts to return down the ramp, to one of a second number of vibrational fabric oriented diverting means, said second number being lower than said first number;

delivering said first unique parts from said diverting means to a separate nest by a vibrational oriented fabric conveyor;

manipulating said first unique parts from said nest to a kitting tray with a robot;

relieving said first unique parts from said feeder means by opening a normally closed gate allowing the first unique parts to escape from the vibrational fabric oriented inclined ramp;

loading said feeder means with at least second unique parts in a manner similar of the loading of the first unique parts;
singulating said second unique parts to said diverting means in a manner similar to the singulating of the first unique parts;
delivering said second unique parts from said diverter means to a separate nest in a manner similar to the delivering of the first unique parts;
manipulating said second unique parts from said second magazines means to said kitting tray in a manner similar to the manipulating of the first unique parts.

* * * * *